Nov. 20, 1956  C. M. DEEM  2,770,912
DUSTING ATTACHMENT
Filed July 15, 1955
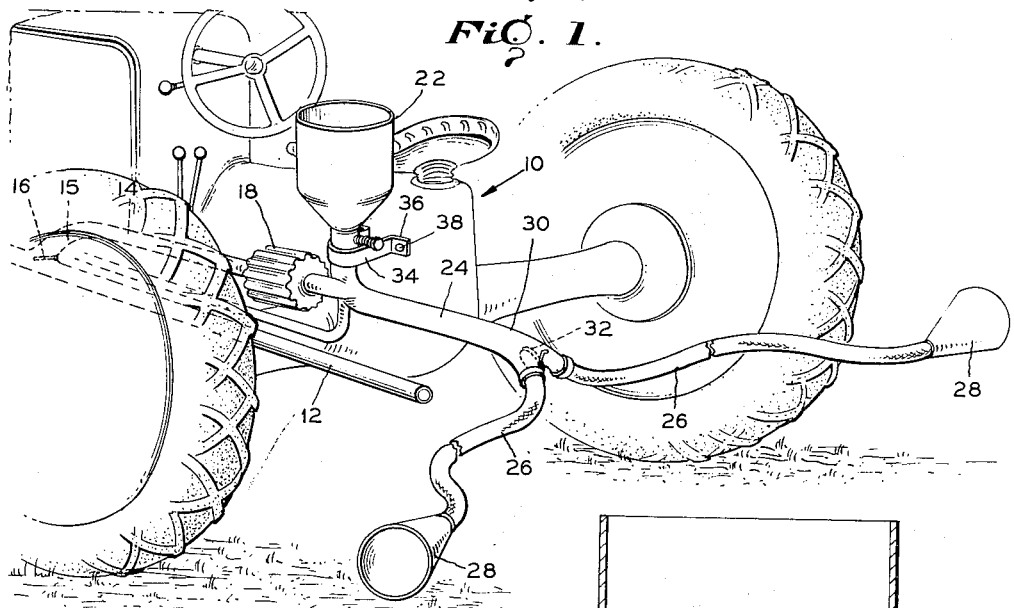
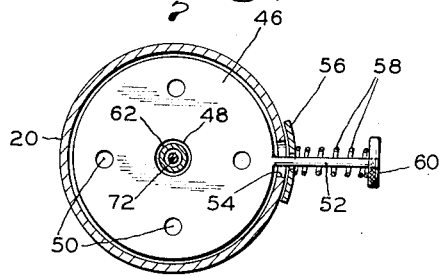
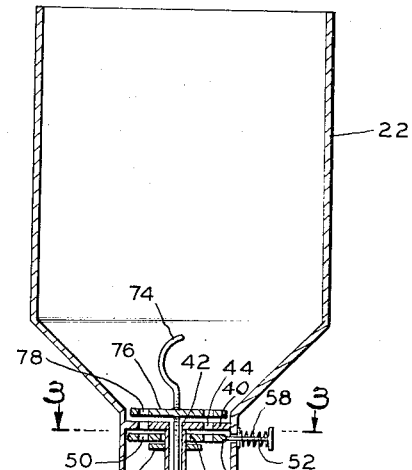
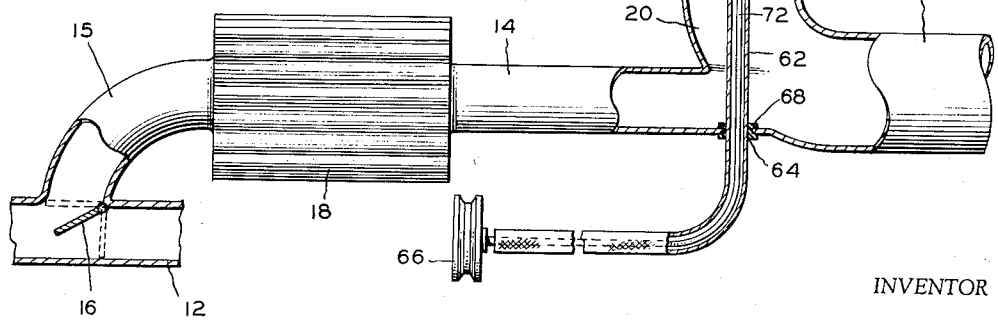
INVENTOR
*Charles M. Deem.*
BY *Justus Miller*
ATTORNEY United States Patent Office 2,770,912
Patented Nov. 20, 1956

2,770,912

DUSTING ATTACHMENT

Charles M. Deem, Saugus, Calif.

Application July 15, 1955, Serial No. 522,289

4 Claims. (Cl. 43—147)

This invention relates to a dusting mechanism for dusting crops and the like, and it particularly relates to a dusting attachment adapted to be mounted on a motor driven vehicle such as a tractor.

It has been the general practice, heretofore, for a farmer to either dust his crops by hand or to rent an expensive dusting machine, even though he might already own a tractor which he uses for other purposes.

It is one object of the present invention to overcome the above-noted disadvantages and expense by providing an attachment which can be easily connected to any ordinary tractor, or even to a truck, jeep or other motor vehicle.

Another object of the present invention is to provide a dusting attachment for motor driven vehicles which is operable by means of the vehicle motor drive.

Another object of the present invention is to provide a dusting attachment for motor driven vehicles which is simple to install, use and maintain, and which consists of relatively few and inexpensive parts.

Other objects of the present invention are to provide an improved dusting attachment, of the character described, that is easily and economically produced, which is sturdy in construction, and which is efficient in operation.

With the above and related objects in view, this invention consists in details of construction and combination of parts, as will be more fully understood from the following description, when read in conjunction with the accompanying drawing in which:

Fig. 1 is a perspective view of a duster attachment embodying the present invention, the attachment being shown mounted on a tractor.

Fig. 2 is a fragmentary side view, partly in elevation and partly in section, of the dusting attachment illustrated in Fig. 1.

Fig. 3 is a cross-sectional view taken on line 3—3 of Fig. 2.

Referring now in greater detail to the drawing wherein similar reference characters refer to similar parts, there is shown a tractor 10 having an exhaust pipe 12 to which is connected a by-pass duct 14; the connection between pipes 12 and 14 being through an elbow 15 on the duct 14. An adjustable butterfly valve 16 is interposed between the pipe 12 and elbow 15 in order to adjust the relative amount of exhaust gases issuing through pipes 12 and 14. A gas pressure equalizer and cooler, indicated generally at 18, is interposed in the conduit 14. The pressure equalizer 18 is corrugated in order to provide a greater cooling area for the gases.

The duct 14 leads to an upstanding chamber 20, at the top end of which is provided a hopper 22. From the opposite side of the chamber 20 there extends a conduit 24, to the end of which are connected one or more flexible dust tubes 26. Each tube 26 has a nozzle 28 on the free end thereof, and is connected at its other end to a corresponding leg of a divider head 30 at the end of the conduit 24. An adjustable butterfly valve 32 is provided in the head 30 for the purpose of regulating the relative supply to each dusting tube 26.

The chamber 20 is attached to the tractor by means of a strap 34 having flanges 36 to accommodate screws, bolts or the like, indicated at 38. Within the chamber, at the upper end thereof, at the junction with the hopper 22, is provided a stationary plate 40 having a central opening 42 and surrounding openings 44 therein.

Below this stationary plate 40 is provided an adjustable plate 46. This plate 46 is also provided with a central opening 48 and side openings 50. The plate 46 is rotatably adjustable to bring the openings 50 into greater or lesser conjunction with the openings 44 in plate 40, so that the passages for the dusting medium can be adjusted in this manner. The plate 46 is adjustable by means of a handle 52 extending through an elongated slot 54 in the side wall of the chamber 20. A guard plate 56 surrounds the handle 52 externally of the chamber and is pressed against the slot 54 by a spring 58 surrounding the handle. The guard plate 56 acts to maintain the slot 54 closed during all movements of the handle 52. The spring 58 is mounted on the handle 52 between the guard plate 56 and a head 60 on the handle.

Connected to the stationary plate 40, around the central opening 42, is a cable housing 62. This cable housing extends through the central opening 48 in the adjustable plate 46, and through an opening 64 in the bottom of the chamber 20, to a position adjacent a pulley 66 connected to the tractor. A seal 68 is provided in the opening 64 around the cable housing, and a sealing ring 70 surrounds the cable housing below the opening 48 in the plate 46.

Extending through the cable housing 62 is a flexible drive cable 72. At its upper end, within the hopper 22, the cable is provided with an agitator 74, immediately below which is provided a plate 76 having perforations 78, and connected at its center to the cable 72. The agitator 74 and perforated plate 76 are rotatable with the cable which, in turn, is connected to the pulley 66 for rotation therewith. The pulley 66 is driven from a power take-off, not shown, or from the tractor fan belt through appropriate reduction gearing.

In operation, with the apparatus connected as shown, as the tractor is driven, the exhaust gases from its engine pass through the exhaust pipe 12. However, in accordance with the way in which the valve 16 is adjusted, a certain proportion of the exhaust gases are by-passed through the elbow 15 and pipe 14, are expanded and cooled at 18, and then flow to the chamber 20; and from there, through the pipe 24, to the dusting tubes 26. Meanwhile, the pulley 66, which is driven from a power take-off from the tractor, rotates the flexible cable 72 which, in turn, rotates the agitator 74 to agitate the dusting material in the hopper so as to cause the particles thereof to fall through the openings 78 in the plate 76. Since the plate 76 is rotatable with the cable 72, the dusting medium falling through its perforations 78 are constantly whirled over the stationary plate 40. The plate 46 has, meanwhile, been rotatably adjusted to vary the size of the opening 44 according to whether a greater or lesser concentration of the dusting medium is desired to be used.

As the dusting medium falls through the perforated plates toward the bottom of the chamber 20, it is entrained by the exhaust gas stream flowing from the pipe 14 and carried on through the pipe 24 to the dusting tubes. The butterfly valve 32 is adjusted in accordance to the proportion of the dusting medium desired to be passed through each dusting tube. Although two dusting tubes and nozzles are shown, either one, or as many as desired, may be used.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A dusting attachment comprising a hopper, a chamber connected to said hopper, an inlet conduit extending from one side of said chamber and adapted to connect said chamber to an engine exhaust pipe, an agitator in said hopper, a flexible cable connected, at one end, to said agitator and the other end extending through said chamber and adapted to be connected to a rotatable drive means, a multiperforated stationary plate between said hopper and said chamber, adjustment means comprising a slidable plate adjacent said stationary plate for adjusting the size of the perforations in said stationary plate, and an outlet conduit extending from the opposite side of said chamber.

2. The attachment of claim 1 wherein a manually actuatable handle is connected, at one end, to said movable plate and has its other end projecting through an elongated slot in said chamber, a cover plate on said handle adapted to cover said elongated slot in all positions of said handle in said slot, and means on said handle to bias said cover plate against said slot.

3. The attachment defined in claim 1 including a tubular multipassage corrugated stationary gas equalizer and cooler disposed between said exhaust pipe and said chamber.

4. In combination, a motor-driven vehicle having an engine equipped with an exhaust pipe extending therefrom, a hopper connected to said exhaust pipe a tubular corrugated stationary pressure equalizer and cooler between said hopper and said exhaust pipe, feed means in said hopper for feeding a dusting medium from said hopper into the exhaust stream from said exhaust pipe a tubular corrugated stationary pressure equalizer and cooler between said hopper and said exhaust pipe, means adapted to convey said exhaust stream, with the dusting medium entrained therein, into a dusting nozzle, and means for adjusting said feed means, said means including a stationary perforated plate, and a spring-biased perforated plate movable adjacent thereto to vary the effective size of the perforations.

References Cited in the file of this patent

UNITED STATES PATENTS

| | | |
|---|---|---|
| 699,435 | Asling | May 6, 1902 |
| 1,229,994 | McWhorter | June 12, 1917 |
| 1,282,697 | Johnson | Oct. 22, 1918 |
| 1,930,588 | Dibble | Oct. 17, 1933 |
| 2,655,406 | Loy et al. | Oct. 3, 1953 |
| 2,686,045 | Byberg | Aug. 10, 1954 |

FOREIGN PATENTS

| | | |
|---|---|---|
| 180,648 | Great Britain | June 1, 1922 |